2,847,351

HAIR WAVING COMPOSITION COMPRISING A DISULFIDE AND EITHER A NON-CORRESPONDING MERCAPTAN OR THIOUREA DIOXIDE

Alfred E. Brown, Washington, D. C., and Herman Bogaty, Silver Spring, Md., assignors to The Gillette Company, Boston, Mass., a corporation of Delaware No Drawing. Application November 8, 1955
Serial No. 545,799

12 Claims. (Cl. 167—87.1)

This invention is directed to a novel composition, which when dissolved in water provides an effective hair waving solution at room temperature, that is, a cold permanent waving solution, and pertains more specifically to liquid, paste, cream, or solid compositions which when dissolved in water provide alkaline solutions of mercaptans capable of reducing hair keratin.

At the present time, almost all hair waving compositions are marketed as aqueous solutions. In most cases, these solutions are alkaline mercaptan compositions which, since they are susceptible to aerial oxidation, must necessarily be properly protected in bottles by taking special means for sealing them. However, rupture of such seals in shipment or storage, or inadequate sealing in manufacture, leads to deterioration of the active ingredient so that the effectiveness of the lotion is greatly diminished. Moreover, the added weight due to the water in the compositions greatly increases shipping costs, and the added bulk is an important factor not only in shipment, but in storage as well. Furthermore, breakage of glass bottles during shipment is a common occurrence and spoilage of other bottles in the same cartons due to odors generated or discoloration of labels, is also costly.

Although for many years solid compositions, formulated so as to provide a waving lotion when dissolved in water, have been proposed, none of those provided to date have attained any success commercially for a variety of reasons. For example, powder compositions based on an alkaline sulfite as the reducing agent have been provided but have not attained any commercial success because of the lower waving effectiveness of such compositions and the prolonged waving times necessary. More recently, solid compositions based on salts of thioglycolic acid, such as sodium or calcium thioglycolate, have been proposed, but such salts of this mercaptan, in the presence of alkalis, are very susceptible to oxidation in the presence of moisture, and attempts at packaging to exclude moisture have not been successful in overcoming the deterioration problem. Moreover, quite often it is found that odors, especially of sulfides, develop in such packages, the odorous material being released in concentrated form when the package is opened by the user to prepare the solution.

One object of this invention is to overcome the deficiencies of the preparations known to the prior art and to provide a novel, stable, odorless composition which dissolves rapidly, that is, within a few minutes when added to water, to produce a hair waving lotion.

Another object is to provide a composition, preferably in the form of a powder, which is readily soluble in water, whereupon an alkaline keratin-reducing mercaptan solution is obtained.

We have found that a composition which is highly effective for waving hair when dissolved in water can be prepared by mixing an odorless water-soluble disulfide of thioglycerol or of thioglycolic acid or of a salt thereof with a water-soluble alkaline material and with a selected odorless, stable reducing agent capable of reducing the disulfide to the corresponding mercaptan when the mixture is dissolved in water. Quite unexpectedly, we have found that some of the preferred odorless reducing agents in the compositions, such as thiomalic acid or thiourea dioxide, are relatively ineffective hair waving agents by themselves even when employed in substantially higher concentrations. Even in those cases where the preferred odorless reducing agent such as dimercaptoadipic acid is an effective hair waving agent at higher concentrations, the compositions of this invention containing such reducing agent are far more effective waving compositions than the reducing agent by itself at the same concentration and alkalinity.

In the case of the disulfide of thioglycolic acid (dithiodiglycolic acid), either the free acid or the corresponding water-soluble normal or half-acid salts may be employed, preferably the alkali metal, ammonium, or amine salts. Particularly preferred are the disulfide of thioglycolic acid and its water-soluble salts. While the disulfide of thioglycolic acid and its salts are obtainable in the form of dry solids or powders, the disulfide of thioglycerol (dithiodiglycerol) is available as a liquid. Mixtures of the two disulfides may also be employed.

The water-soluble alkaline materials which may be employed in the compositions of the invention may be either organic or inorganic basic compounds or mixtures of either type or both types. Of organic materials, water-soluble aliphatic amines, particularly primary and secondary amines, are preferred. Those which have been found to give especially good results include mono- and dialkylolamines such as mono- and diethanolamine, mono- and diisopropanolamine, 2-amino-2-methyl-1,3-propanediol, N-methyl-glucamine, sodium glycinate, etc. Among the inorganic basic compounds found especially satisfactory are sodium carbonate, disodium phosphate, trisodium phosphate, borax, ammonium carbonate, and the like, although alkali metal hydroxides such as sodium hydroxide may be used.

The odorless water-soluble reducing agents which have been found to be highly effective are thiomalic acid, alpha,alpha'-dimercaptoadipic acid and their water-soluble normal and half-acid salts, particularly the alkali metal, ammonium and amine salts, and thiourea dioxide, sometimes known as formamidine sulfinic acid. Mixtures of two or more of such reducing agents may also be employed.

Although the relative proportions of the three principal ingredients are not critical, satisfactory results have been obtained by employing from 0.45 to 4.0 moles of reducing agent for each mole of disulfide, with 0.6 to 2.0 moles of reducing agent for each mole of disulfide being preferred. The alkaline material must be present in excess of the amount required to neutralize any acidic groups in either the disulfide or reducing agent compounds present. This excess of alkaline material may be present in an amount of 0.5 to 2.0 moles for each mole of disulfide, preferably from 1.0 to 1.5 moles per mole of disulfide. For the purposes of the present invention, thiourea dioxide may be regarded as an acidic material which requires neutralization with approximately an equimolar proportion of a base such as sodium hydroxide. Generally, the amount of excess will be dependent not only on the relative amounts of the disulfide and reducing agent present but also on their specific molecular structures.

While the relative proportions of the three principal ingredients have been set forth above in a general way, it will be understood that in any particular case optimum results may appear in relatively narrow ranges of proportions within the foregoing broad ranges, depending upon the particular ingredients present and the particular hair waving procedure in which the aqueous lotion is to be used.

In addition to the three essential ingredients described above, the waving composition may also contain a small amount of wetting agent, usually of the order of about 0.2% by weight of the dry composition, depending upon the efficiency of the particular wetting agent used. Obviously, the wetting agent selected should be readily soluble or dispersible on dissolving the composition in water and should not be reactive chemically with any of the components of the powdered mix. Typical wetting agents which may be used are such materials as Nacconol NR (an alkyl aryl sulfonate) and Pluronic F68 (a condensate of ethylene oxide with a hydrophobic base formed by condensing propylene oxide with propylene glycol). In addition, the composition may also contain a clouding or creaming agent so that an opaque creamy lotion will result on addition of water. Perfumes and coloring agents may also be added as desired.

The following examples are illustrative of the waving compositions which fall within the scope of this invention:

*Example 1*

| | Moles |
|---|---|
| Diammonium dithiodiglycolate | 0.7 |
| Thiourea dioxide | 0.7 |
| Diisopropanolamine | 2.3 |

*Example 2*

| | |
|---|---|
| Diammonium dithiodiglycolate | 0.7 |
| Thiourea dioxide | 0.7 |
| N-methylglucamine | 1.7 |

*Example 3*

| | |
|---|---|
| Diammonium dithiodiglycolate | 0.7 |
| Thiourea dioxide | 0.7 |
| N-methylglucamine | 1.3 |

*Example 4*

| | |
|---|---|
| Diammonium dithiodiglycolate | 0.5 |
| Thiourea dioxide | 0.3 |
| Sodium carbonate | 0.7 |

*Example 5*

| | |
|---|---|
| Diammonium dithiodiglycolate | 0.5 |
| Thiourea dioxide | 0.3 |
| Ammonium carbonate monohydrate | 1.1 |

*Example 6*

| | |
|---|---|
| Diammonium dithiodiglycolate | 0.4 |
| Diammonium thiomalate | 0.7 |
| Ammonium carbonate monohydrate | 0.5 |

*Example 7*

| | |
|---|---|
| Diammonium dithiodiglycolate | 0.7 |
| Diammonium thiomalate | 0.7 |
| Ammonium carbonate monohydrate | 1.0 |

*Example 8*

| | |
|---|---|
| Diammonium dithiodiglycolate | 0.4 |
| Diammonium thiomalate | 0.7 |
| Sodium carbonate | 0.6 |

*Example 9*

| | |
|---|---|
| Diammonium dithiodiglycolate | 0.4 |
| Diammonium thiomalate | 0.7 |
| Diisopropanolamine | 0.6 |

*Example 10*

| | |
|---|---|
| Diammonium dithiodiglycolate | 0.5 |
| Diammonium thiomalate | 0.4 |
| Sodium carbonate | 0.5 |

*Example 11*

| | |
|---|---|
| Diammonium dithiodiglycolate | 0.4 |
| Diammonium thiomalate | 0.5 |
| Sodium carbonate | 0.5 |

*Example 12*

| | Moles |
|---|---|
| Dithiodiglycolic acid | 0.5 |
| Thiomalic acid | 0.4 |
| Diisopropanolamine | 2.4 |

*Example 13*

| | |
|---|---|
| Monosodium dithiodiglycolate | 0.5 |
| Thiourea dioxide | 0.3 |
| Diisopropanolamine | 1.2 |

*Example 14*

| | |
|---|---|
| Monoethanolammonium half-acid dithiodiglycolate | 0.4 |
| Disodium thiomalate | 0.5 |
| Diisopropanolamine | 1.1 |

*Example 15*

| | |
|---|---|
| Disodium dithiodiglycolate | 0.35 |
| Disodium alpha,alpha'-dimercaptoadipate | 0.35 |
| 2-amino-2-methyl-1,3-propanediol | 0.5 |

*Example 16*

| | |
|---|---|
| Diammonium dithiodiglycolate | 0.4 |
| Diammonium alpha,alpha'-dimercaptoadipate | 0.4 |
| Sodium carbonate | 0.6 |

*Example 17*

| | |
|---|---|
| Dithiodiglycolic acid | 0.5 |
| Thiourea dioxide | 0.3 |
| N-methylglucamine | 0.6 |
| Diisopropanolamine | 0.6 |
| Trisodium phosphate | 0.6 |

*Example 18*

| | |
|---|---|
| Diammonium dithiodiglycolate | 0.4 |
| Diammonium thiomalate | 1.0 |
| Sodium carbonate | 0.6 |

*Example 19*

| | |
|---|---|
| Diammonium dithiodiglycolate | 0.4 |
| Thiourea dioxide | 0.3 |
| Sodium carbonate | 1.7 |

*Example 20*

| | |
|---|---|
| Dithiodiglycerol | 0.4 |
| Thiourea dioxide | 0.3 |
| Sodium carbonate | 0.7 |

*Example 21*

| | |
|---|---|
| Dithiodiglycerol | 0.4 |
| Diammonium thiomalate | 0.7 |
| Sodium carbonate | 0.6 |

*Example 22*

| | |
|---|---|
| Dithiodiglycerol | 0.4 |
| Diammonium alpha,alpha'-dimercaptoadipate | 0.4 |
| Sodium carbonate | 0.6 |

The dry ingredients are suitably mixed and then preferably packaged in heat-sealed, moisture-proof envelopes or other containers. In the case of those compositions in which all of the ingredients are dry solids it is frequently feasible to pelletize the composition after mixing, while those compositions in which one or more of the ingredients is a liquid and which are in the form of a paste or viscous liquid may be packaged in capsules or collapsible tubes or in any other suitable manner. Although it is preferred in the practice of this invention to maintain the composition substantially dry during shipment and storage, dissolving the dry composition in the desired amount of water shortly before use, it may be feasible in some cases to incorporate a small mount of water in the dry composition when first made in order to convert the dry powder to a paste for convenience in packaging. In addition, since the disulfide itself is stable even in aqueous solutions, the disulfide may be provided in the form of an aqueous solution with or without the alkaline material, and the reducing agent may be supplied separately in dry form (with the alkaline material when that is not with the disulfide) for dissolution shortly before use. It is feasible, of course, to provide a home permanent waving kit containing each of the three principal ingredients packaged separately in the form of a powder, paste, cream, etc., for dissolution in water shortly before use.

In use, the dry compositions are dissolved in sufficient water at room temperature to give the molar concentrations indicated in the examples. As an illustration, in Example 4, 50 parts by weight of diammonium dithiodiglycolate, 15 parts of thiourea dioxide and 35 parts sodium carbonate are mixed. For a home cold waving kit, 16.1 g. of this mixture is sealed in an envelope. In use, this composition is dissolved in 68 ml. of water to give enough lotion to wave an entire head of hair. In Example 8, 31 parts by weight of diammonium dithiodiglycolate, 46 parts of diammonium thiomalate, and 23 parts of sodium carbonate are mixed. For a home waving end curl kit, 13.9 g. of this mixture is sealed in a plastic envelope. The contents are dissolved in 43 ml. of water. This quantity of lotion is sufficient to wave the ends of hair on a woman's head. With the compositions of this invention, it is also possible for the consumer to be directed to dissolve the dry composition in a larger quantity of water to give a more dilute solution if looser wave results are desired. For example, in the illustration of Example 4 cited, instead of dissolving the powder in 68 parts of water, it can be dissolved in 81 parts of water to give a milder waving solution for easy-to-wave or bleached hair.

The solution prepared as indicated above may be used in a variety of waving processes. That is, the hair is shampooed, rinsed, and towel blotted to leave it damp. The hair is then separated into tresses which are combed, saturated with the waving solutions prepared above, and the saturated tresses are wound around conventional curlers in the usual manner. The wrapped tresses are then saturated again with the waving lotion and the curls are allowed to process for 15 minutes. After this time, the wrapped tresses are rinsed with warm water, covered with a towel turban, and allowed to process for 30 minutes. After this time, the tresses are neutralized in the usual manner with a solution of an oxidizing agent containing, for example, sodium perborate, by pouring the solution over the tresses and then pouring it through the tresses after unwinding the hair from the curlers. Alternatively, the tresses may be processed with the waving lotion present for 30 to 60 minutes without an intermittent rinse, and then neutralized in the conventional manner described. In the processes involving a neutralizer solution, the waving kit containing the powdered waving composition of this invention would also contain an envelope of a conventional solid neutralizer composition, such as sodium perborate or the like.

The compositions of this invention, after solution in water, may also be used in so-called automatic neutralization processes as described in U. S. Patent 2,688,972. In such processes, the hair is saturated with lotion, wrapped on curlers, resaturated with lotion, and allowed to process for 15 minutes. The wrapped hair is then rinsed, and allowed to remain on the rods for time periods of 2 to 6 hours, or overnight, depending upon the curl result desired. The solutions may also be used in pin-curl waving processes wherein the hair is saturated with lotion before or after winding it into pin curls. Alternatively, the hair may be saturated with lotion both before and after winding. It is then allowed to process for 15 minutes, after which it is rinsed, and allowed to dry in the pin-curl form. Alternatively, after the pin curls have processed for about 60 minutes, they can be neutralized with conventional neutralizer solutions as described above. In all of these processes, the curl levels achieved are generally similar to those produced by conventional commercial cold waving solutions containing ammonium thioglycolate as the active hair reducing agent when used in the same processes. In some cases where the hair is wrapped on curlers, the hair can be treated with lotion, either before or after winding, and the curls may process until the lotion dries on the hair. It is then unwound, and rinsed if desired.

In use in the home, the consumer would dissolve the dry composition in water, generally with stirring for a few minutes or so with a plastic curler such as is normally used for wrapping the hair. Since it may take as long as an hour or so to wrap all the curls on a given head of hair, it is important that the solution prepared be chemically stable and effective for waving hair over at least such time periods. All of the solutions prepared with the compositions of this invention are stable and effective not only over time periods of an hour or so, but many solutions are also stable after standing overnight.

It should be noted that the compositions of this invention when in the dry form may be substantially completely odorless if the proper alkaline material is chosen. If the use of ammonium salts is avoided even aqueous solutions of the present compositions possess a very low odor level; even when ammonium salts are present the solutions are far less odorous than conventional ammonium thioglycolate solutions.

The condition of the hair after waving with the compositions described in this invention is very desirable in terms of ease of combing and feel of the hair. Moreover, as indicated by measurements of mechanical properties, the fibers exhibit excellent tensile properties compared to those produced by waving with conventional mercaptan lotions. Indeed, the properties of hair waved with the compositions of this invention, even though satisfactory curl levels are produced, are altered remarkably little even after repeated waving.

Although specific embodiments of the invention have been described herein, it is not intended to limit the invention solely thereto, but to include all of the obvious variations and modifications within the spirit and scope of the appended claims.

We claim:

1. A water-soluble hair waving composition comprising (1) a member of the class consisting of the disulfide of thioglycolic acid, water-soluble salts thereof, and the disulfide of thioglycerol, (2) a reducing agent selected from the class consisting of thiomalic acid, dimercaptoadipic acid, water-soluble salts thereof, and thiourea dioxide, and (3) water-soluble alkaline material in excess of that required to react with any acid groups present in the disulfide and reducing agent compounds.

2. A water-soluble hair waving composition comprising (1) a member of the class consisting of the disulfide of thioglycolic acid, water-soluble salts thereof, and the disulfide of thioglycerol, (2) a reducing agent selected from the class consisting of thiomalic acid, dimercaptoadipic acid, water-soluble salts thereof, and thiourea dioxide present in an amount from 0.45 to 4.0 moles for each mole of said disulfide, and (3) water-soluble alkaline material present in an amount from 0.5 to 2.0 moles for each mole of said disulfide in excess of the amount required to neutralize any acidic groups present in the disulfide and reducing agent compounds.

3. A water-soluble hair waving composition as defined in claim 2 in which the alkaline material is an inorganic basic compound in which the cation is a member of the class consisting of alkali metals and ammonium.

4. A water-soluble hair waving composition as defined in claim 2 in which the alkaline material is an aliphatic amine.

5. A water-soluble hair waving composition as defined in claim 2 in which the composition is substantially free of water.

6. A water-soluble hair waving composition comprising the disulfide of thioglycolic acid, thiomalic acid in an amount from 0.45 to 4.0 moles for each mole of said disulfide, and a water-soluble alkaline material in an amount from 0.5 to 2.0 moles for each mole of disulfide in excess of the amount required to neutralize the acidic groups present in the disulfide and the thiomalic acid.

7. A water-soluble hair waving composition comprising the disulfide of thioglycolic acid, thiourea dioxide in an amount from 0.45 to 4.0 moles for each mole of disulfide, and water-soluble alkaline material in an amount from 0.5 to 2.0 moles for each mole of disulfide in excess of the amount required to neutralize the acidic groups present in the disulfide and the thiourea dioxide.

8. A water-soluble hair waving composition comprising the disulfide of thioglycolic acid, dimercaptoadipic acid in an amount from 0.45 to 4.0 moles for each mole of disulfide, and water-soluble alkaline material in an amount from 0.5 to 2.0 moles for each mole of disulfide in excess of the amount required to neutralize the acidic groups present in the disulfide and the dimercaptoadipic acid.

9. A water-soluble hair waving composition comprising the disulfide of thioglycerol, thiomalic acid in an amount from 0.45 to 4.0 moles for each mole of disulfide, and water-soluble alkaline material in an amount from 0.5 to 2.0 moles for each mole of disulfide in excess of the amount required to neutralize the acidic groups present in the disulfide and the thiomalic acid.

10. A water-soluble hair waving composition comprising the disulfide of thioglycerol, thiourea dioxide in an amount from 0.45 to 4.0 moles for each mole of disulfide, and water-soluble alkaline material in an amount from 0.5 to 2.0 moles for each mole of disulfide in excess of the amount required to neutralize the acidic groups present in the thiourea dioxide.

11. A water-soluble hair waving composition comprising the disulfide of thioglycolic acid, thiomalic acid in an amount from 0.45 to 4.0 moles for each mole of disulfide, and a water-soluble inorganic basic compound in which the cation is a member of the class consisting of alkali metals and ammonium, said basic compound being present in an amount from 1.0 to 1.5 moles for each mole of disulfide in excess of the amount required to neutralize the acidic groups present in the disulfide and the thiomalic acid.

12. A water-soluble hair waving composition as defined in claim 11 in which the composition is substantially free of water.

References Cited in the file of this patent

UNITED STATES PATENTS

| | | |
|---|---|---|
| 2,403,937 | Lubs | July 16, 1946 |
| 2,615,782 | Haefele | Oct. 28, 1952 |
| 2,615,828 | Haefele | Oct. 28, 1952 |
| 2,719,813 | Haefele | Oct. 4, 1955 |
| 2,719,814 | Haefele | Oct. 4, 1955 |
| 2,719,815 | Sanders | Oct. 4, 1955 |